United States Patent
Destain

(10) Patent No.: US 7,843,654 B2
(45) Date of Patent: Nov. 30, 2010

(54) COLLECTING LENS

(75) Inventor: Patrick Rene Destain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 12/240,115

(22) Filed: Sep. 29, 2008

(65) Prior Publication Data

US 2010/0079872 A1    Apr. 1, 2010

(51) Int. Cl.
G02B 9/06 (2006.01)
G02B 9/04 (2006.01)
F21V 5/04 (2006.01)

(52) U.S. Cl. .................. 359/794; 359/796; 359/793; 362/311.02

(58) Field of Classification Search .............. 257/98, 257/E33.073; 359/641, 644, 793, 794, 796; 362/311.02, 331
See application file for complete search history.

(56) References Cited

U.S. PATENT DOCUMENTS

| | | | |
|---|---|---|---|
| 4,698,730 A | 10/1987 | Sakai et al. | |
| 6,547,423 B2 | 4/2003 | Marshall et al. | |
| 6,924,943 B2 | 8/2005 | Minano et al. | |
| 7,160,522 B2 | 1/2007 | Minano Dominguez et al. | |
| 7,181,378 B2 | 2/2007 | Benitez et al. | |
| 7,215,479 B1 * | 5/2007 | Bakin | 359/664 |
| 7,529,043 B2 * | 5/2009 | Mori et al. | 359/811 |
| 7,717,599 B2 * | 5/2010 | Grace et al. | 362/555 |
| 2005/0179041 A1 | 8/2005 | Harbers et al. | |
| 2007/0152231 A1 | 7/2007 | Destain | |

* cited by examiner

*Primary Examiner*—David N Spector
(74) *Attorney, Agent, or Firm*—Charles A. Brill; Wade James Brady, III; Frederick J. Telecky, Jr.

(57) ABSTRACT

A system and method for collimating light emitted from a light source, such as a light-emitting diode (LED), is provided. The system and method includes two lenses, both lenses having a positive power for converging the light rays. In one example, the first lens is a hemispherical ball lens and the second lens is configured such that one surface conforms to the exiting surface of the first lens. The exiting surface of the second lens may be, for example, a Fresnel lens or an aspherical lens. In another example, the first lens may be a hemispherical or a hyperhemispherical ball lens. The second lens has an outer circumference having two aspherical surfaces. The inner portion of the second lens is in direct contact with the first lens. This configuration creates a dual-channel collimator.

23 Claims, 3 Drawing Sheets

COLLECTING LENS

TECHNICAL FIELD

Embodiments relate generally to the field of projection display systems and methods, and more particularly, to a two element collecting lens.

BACKGROUND

Projection displays are used for a wide variety of applications, such as producing the pictures viewed on television screens. A typical projection display system includes a number of components, including a display screen, a light source, and an optical path between them. To create the pictures, one or more light sources are provided to emit light when it is needed. The light they produce is then manipulated by a series of optical devices in order to create the visual image. The visual image created along the optical path is then displayed on the display screen, the television screen for example, or another visual display. In most cases, the goal is to produce the best picture possible. The key to producing a desirable visual display, of course, is the configuration of the various optical devices along the optical path. The selection, operation, and configuration of these devices also contribute to unseen characteristics of the system, such as cost, size, and efficient use of system resources.

Several types of projection displays have recently been developed. These new display systems are now becoming much more common, serving as a replacement for the widely-used CRT (cathode ray tube) display, which produces a visual image by producing and directing a stream of electrons at a treated display surface. The stream could only be directed to one point at any given time, but can be systematically swept across the display with such speed as to create the visual impression of a single image. This technology is fairly well-developed, but has reached the point where perceptible increases in quality are difficult to achieve. A CRT also takes up a relatively-large amount of space because the components used for generating the electron stream must be placed at a certain distance from the display screen. Many recently-developed projection display systems, in contrast, feature a much slimmer profile. In addition, projection display systems often produce much cleaner visual images. The combination of these advantages has made such systems immensely popular.

One such projection-display system is a spatial light modulator (SLM) commercially available from Texas Instruments of Dallas, Tex. under the trademark DLP® (or Digital Light Processing®). DLP® projection-display systems utilize a digital micromirror device (DMD) in their optical path. The DMD typically includes an array of thousands of tiny mirrors that are used to manipulate colored light originating at an internal light source. Lenses and other components in the optical path adjust the light for use by the SLM, or convey the image it generates to a display plane. The colored light is reflected by the SLM and projected onto a display plane for viewing according to an input image. Projection lenses may be used to magnify and/or focus the image on the display plane.

It should be noted that the light source may be any type of light source, including a light-emitting diode (LED), a lamp, a laser, or the like. Some light sources, particularly LEDs, emit light that exhibit Lambertian characteristics. As illustrated in FIG. 1, an LED 100 typically emits light over a wide solid angle, i.e., the light is not directed or collimated along a specific direction. As a result, display systems typically include one or more optical elements to image the LED source light onto the DMD without degrading the etendue at the DMD. The concept of "etendue" refers to the geometric extent of a source or any other component having a limited area and acceptance cone angle. In the context of an SLM-based system, the source of light incident on the SLM has an etendue that corresponds to the size and directionality of the source, and the SLM also has an etendue that corresponds to its size and ability to receive light from various directions. It is desirable that the etendue of the LED and the SLM be matched, or in other words, the high divergence with a small area of the LED is equal to the lower divergence with a bigger area of a SLM such as a DMD. The main challenge is to image the LED source by reducing the light source emission angle onto the DMD without degrading that same etendue (if too much aberration is present making the image blurred and less "bright" than the source).

These attempts, however, typically require a series of lenses that must be in strict alignment relative to each other as well as the LED light source and the SLM. Due to the alignment issues, the lens system can be extremely difficult and expensive to produce.

Accordingly, there is a need for a system and method to collimate light that is easy and efficient to produce.

SUMMARY OF THE INVENTION

These and other problems are generally solved or circumvented, and technical advantages are generally achieved, by embodiments of the present invention that provide a system and a method for a collimator suitable for use in, for example, a display system.

In accordance with an embodiment, an image projection system is provided. The image projection system includes a light source, a spatial light modulator, and a collimator positioned between the light source and the spatial light modulator along the light path. The collimator includes a first lens and a second lens in direct contact with each other. The first lens may be a hemispherical or hyperhemispherical ball lens. In an embodiment in which a hemispherical ball lens is used, the second lens may be in direct contact with the entire hemispherical surface, and the second lens may include a converging lens such as a Fresnel lens.

In accordance with another embodiment, a collimator is provided. The collimator includes a first lens having a first surface and a second surface and a second lens having a third surface and a fourth surface. At least a portion of the third surface of the second lens is in direct contact with the second surface of the first lens. The first lens may be hemispherical or hyperhemispherical.

In accordance with another embodiment, a method of providing a projection system is provided. The projection system includes providing a light source and positioning a collimator along the light path of the light source. The collimator includes a first lens and a second lens having a positive power and in direct contact with each other.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments will be described in a specific context, namely, a spatial light modulator (SLM) based projection display system. Embodiments may also be applied, however, to projection display systems, in general, and specifically to other microdisplay-based projection display systems, such as those utilizing transmissive or reflective liquid crystal displays, liquid crystal on silicon, ferroelectric liquid-crystal-on-silicon, deformable micromirrors, and so forth. It should also be appreciated that embodiments described herein are illustrated with reference to specific sizes and materials. One of ordinary skill in the art will realize that the embodiments herein may be adjusted to account for variations in the dimensions, the wavelengths of the relevant light, the materials, and/or the like.

Figure 1:
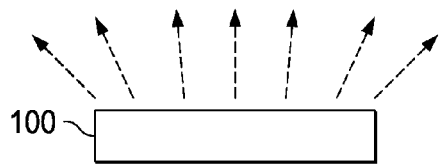
FIG. 1 is an illustration of the light emitted from a prior art light source exhibiting Lambertian characteristics.
Figure 2:
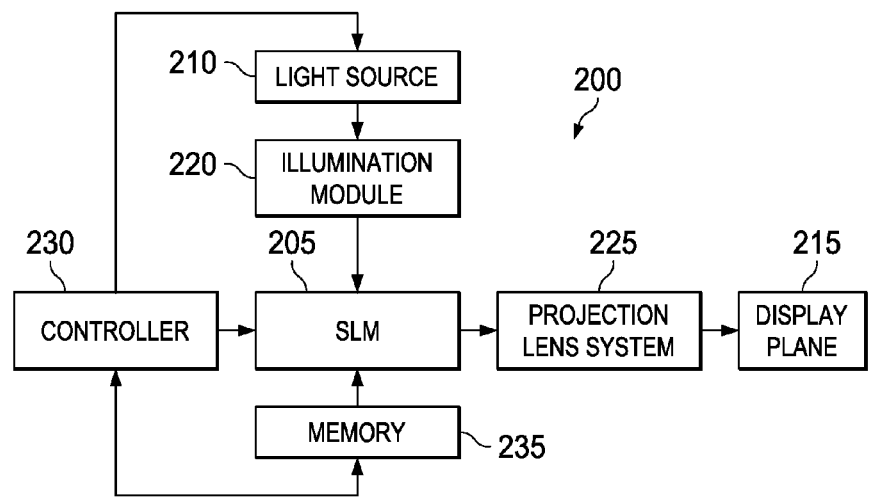
FIG. 2 is a block diagram of a display system incorporating a collimator in accordance with an embodiment.

With reference now to FIG. 2, there is shown a diagram illustrating an exemplary embodiment of a SLM display system. The diagram shown in FIG. 2 illustrates a high-level view of a SLM-based projection display system 200, which includes a SLM 205 that modulates light produced by a light source 210. The SLM 205 is an example of a microdisplay and may include any suitable microdisplay, such as DMD, transmissive or reflective liquid crystal, liquid crystal on silicon, deformable micromirrors, and so forth. In a microdisplay, an array of light modulators may be arranged in a rectangular, square, diamond shaped, and so forth, array. Each light modulator in the microdisplay may operate in conjunction with the other light modulators to modulate the light produced by the light source 210. The light, modulated by the SLM 205, may be used to create images on a display plane 215. The SLM-based projection display system 200 also includes an illumination module 220, which may be used to collimate and shape the light produced by the light source 210 as well as collect stray light, and a projection lens system 225, which may be used to manipulate (for example, focus and magnify) the light reflecting off the SLM 205.

The SLM 205 may be coupled to a controller 230, which may be responsible for loading image data into the SLM 205, controlling the operation of the SLM 205, controlling the light produced by the light source 210, and so forth. A memory 235, which may be coupled to the SLM 205 and the controller 230, may be used to store the image data, as well as configuration data, color correction data, and so forth.

It should be noted that the light source 210 may be any type of light source, including a light-emitting diode (LED), a lamp, a laser, or the like. Embodiments such as those described herein, however, may be more beneficial when using light sources that exhibit Lambertian characteristics, such as a LED.

The light source 210 may also include a plurality of light sources. For example, a plurality of LEDs may be used. In this embodiment, one or more LEDs emitting different colors, such as a red-light emitting LED, a blue-light emitting LED, and a green-light emitting LED, are used. In some applications, it may be desirable to utilize multiple LEDs (or other light sources) for each color to increase the brightness of the resulting image on the display plane 215.

It should be noted that the embodiments discussed above are provided for illustrative purposes only, and that other configurations may be used. For example, other light sources, lens systems, mirrors, and the like may be used. Furthermore the number of each individual component may vary. For example, the number and colors included in the light source may vary, the number and size of the DMD may vary, and the like. As another example, a display system may include scanning elements, such as a rotating reflective element or a rotating refractive element, to scan one or more light sources across the surface of the SLM.

Figure 3:
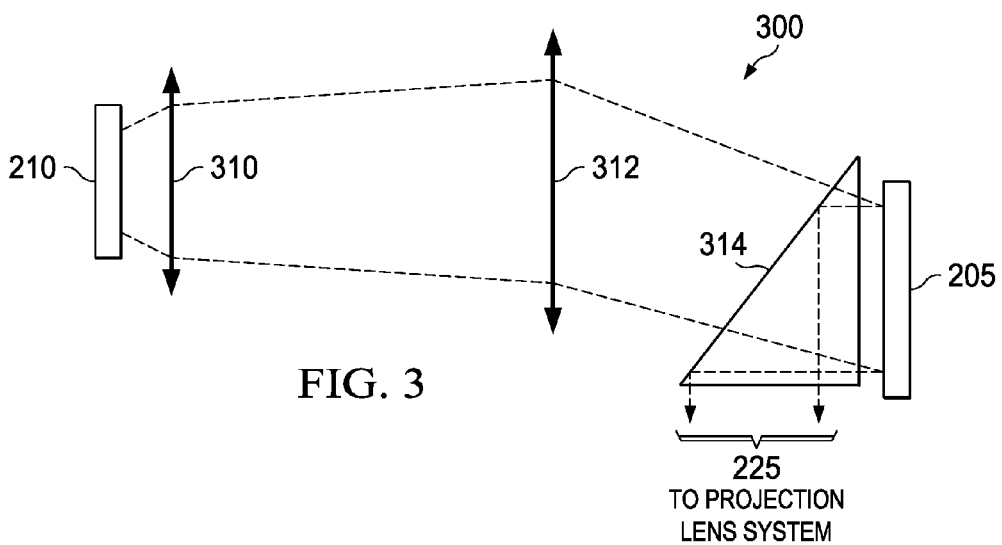
FIG. 3 is a diagram of an optics system incorporating a collimator in accordance with an embodiment.

Referring now to FIG. 3, there is shown an optics system 300 that relays light from the light source 210, such as an LED, to the projection lens system 225. A two element collecting lens 310 converges the light emitted from the light source 210, thereby presenting collimated light to one or more lenses 312. The collimated light is focused onto a surface of the SLM 205. A total internal reflection (TIR) prism 314 may be used to direct light from the SLM 205 to the projection lens system 225, and hence the display plane 215 (see FIG. 2). The TIR prism 314 reflects or transmits incident light depending on whether the angle of incidence exceeds or is less than a critical angle for the material, as known in the art. It should be noted that the TIR prism 314 may comprise multiple prisms.

As illustrated in FIG. 3, the two element collecting lens 310 reduces the dispersion of the light emitted by the light source 210. In this manner, the etendue at the SLM 205 is preserved and approximately matching the etendue of the light source 210.

Figure 4:
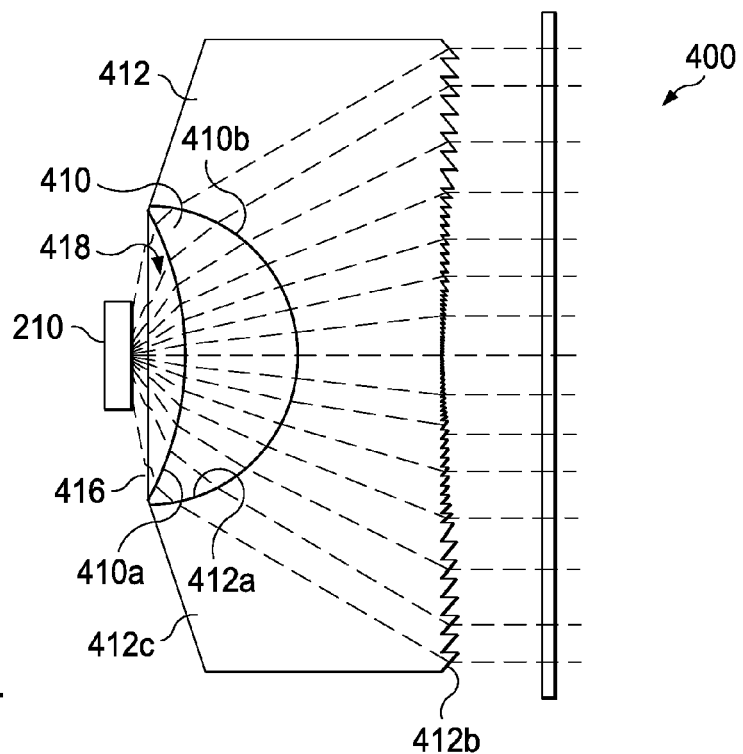
FIG. 4 is a two element collecting lens in accordance with an embodiment.

FIG. 4 illustrates an embodiment of a two element collecting lens 400 that acts as a collimator and may be used in an optics system such as those discussed above. The two element collecting lens 400 comprises a first lens 410 and a second lens 412 sharing a common interface to create a compact package. Generally, a typical doublet has a flint lens having a negative power and a crown lens having a positive power. In contrast to the typical doublet, the two element collecting lens 400 discussed herein is such that the first lens 410 and the second lens 412 both have a positive power. This allows both lenses to work to converge the light emitted by the light source 210.

The first lens 410 is preferably a (nearly or) hemispherical ball lens having a first surface 410a and a second surface 410b. The second surface 410b of the first lens 410 comprises an outer spherical surface of a hemispherical ball lens and the first surface 410a of the first lens 410 is a concave spherical surface formed into the otherwise planar surface of the hemisphere. The first lens 410 may be molded from a flint glass or plastic, such as SF66 having a refractive index of about 1.93 or OHARA LAH79 having a refractive index of about 2.0. Other materials may be used; however, it is preferred that the material used for the first lens have a refractive index of at least 1.7.

It is preferred that the first lens 410 be in an aplanetic configuration in that there is little or no spherical aberration or coma. Accordingly, the first lens 410 is preferably configured such that the center of the radial curvature of the first surface 410a and the second surface 410b of the first lens 410 are along the optical axis. In this configuration, the first surface 410a and the second surface 410b of the first lens 410 are rotationally symmetric about the optical axis. The center of the radial curvature for the first surface 410a is preferably along a line drawn from the leftmost portions of the first lens 410, e.g., the first lens 410 is hemispherical.

The second lens 412 has a first surface 412a that shares a common interface with the second surface 410b of the first lens 410 and a second surface 412b having a shape that acts to further converge the light, such as a Fresnel lens, an aspherical surface, a convex lens, or the like. By sharing a common surface, the first lens 410 and the second lens 412 may be assembled easily with little or no misalignment between the lenses. In an embodiment, the second lens 412 is formed of a crown glass or plastic, such as polymethyl methacrylate (PMMA) having a refractive index of about 1.5 or polycarbonate having a refractive index of about 1.59. Other materials may be used; however, it is preferred that the material used for the second lens 412 have a refractive index of about 1.5, and more preferably has a refractive index less than the refractive index of the first lens 410. If desired, the first lens 410 and the second lens 412 may be coupled together using an optical adhesive.

Preferably, the first lens 410 and the second lens 412 both have a positive power such that both the first lens 410 and the second lens 412 act to converge the light emitted from the light source 210. In this manner, divergent light emitted from a light source such as an LED is converged and collimated. This allows an easier propagation of the light to the downstream optics and provides an easier way to conserve the etendue and makes a more efficient system with an optimum (or higher) luminance. Furthermore, the first lens 410 preferably has a higher refractive index (most preferably greater than about 1.7) than the refractive index of the second lens (most preferably between about 1.4 and 1.7) for the relevant light wavelengths.

It should be appreciated that an outer surface 412c of the second lens 412 may be any shape, provided that the convergence of the light is not interrupted. In this manner, the outer surfaces 412c may be shaped to provide an easy, secure, and accurate alignment with the light source 210. For example, the light source 210 may be mounted to a frame, which is shaped to receive the second lens 412. This allows the first lens 410 and the second lens 412 to be assembled as one piece and attached to the frame, wherein the frame helps maintained proper alignment with the light source 210.

The cavity 418 may comprise air, a light transmissive liquid, gel, or other non-solid material, or the like. Optionally, a transmissive window 416 may be included, and may be used to seal the liquid, gel, or other material in the cavity 418, if used. Alternatively, the cavity 418 may be filled with a curable liquid resin or adhesive. In this embodiment, the cavity is initially filled with a liquid such as Norland Optical Adhesive 81 (NOA81) and then cured or hardened by exposure to UV light, short wavelength radiation or the like. If used, the material filling the cavity 418 preferably has a refractive index of about 1.4 to about 1.6. The transmissive window 416 is preferably a rigid element having highly transmissive properties, such as BK7 having a refractive index of about 1.45 to about 1.55. At the same time, the doublet can advantageously replace the window and still seal the emitting source.

Details of an example of the construction of two element collecting lens such as that illustrated in FIG. 4 is provided in Table 1. It should be noted that this embodiment is but one example, and other dimensions, materials, and configurations may be used. In this example, it is assumed an LED having dimensions up to 6.4 mm×2.6 mm emitting light in the 450 nm-700 nm wavelengths is being used. This configuration has a length from the surface of the light source 210 to the second surface 412b of the second lens 412 of about 13 mm, and the height of the second lens is about 14 mm. It has been found that such a configuration exhibits an etendue degradation of less than about 10% to 20%.

TABLE 1

| Radius of Curvature (mm) | Thickness (mm) | Material | Conic | Lens Surface |
|---|---|---|---|---|
| Infinite | 1 | Air | 0 | Airgap between LED (210) and the Window (416) |
| Infinite | 0.3 | BK7 | 0 | Window (416) (optional) |
| Infinite | 1.65 | Air | 0 | Cavity (418) |
| −16.363 | 7 | SF66 | 0 | First Surface 410a of First Lens 410 |
| −7.37 | 5.201 | Poly-carbonate | 0 | Interface between First Lens (410) and Second Lens (412) |
| −17.387 | | Air | 0 | Second Surface 412b of Second Lens 410 (Fresnel Lens) |

In this embodiment, the surface of the Fresnel lens comprises an aspherical surface as defined by the following polynomial expansion:

$$z = \frac{c\rho^2}{1+\sqrt{1-(1+k)c^2\rho^2}} + a_1\rho^2 + a_2\rho^4 + a_3\rho^6 + a_4\rho^8 + a_5\rho^{10} + a_6\rho^{12} + a_7\rho^{14} + a_8\rho^{16}$$

where k is the "conic coefficient" for the surface, and where c is the curvature (1/radius) of the base sphere (from which the asphere deviates) at the vertex, and the coefficients $\alpha_i$ are the aspheric coefficients defining the shape of the asphere. The aspheric coefficients according to an embodiment are provided below in Table 2.

TABLE 2

| Coefficient | Value |
|---|---|
| $a_1$ | 0.0 |
| $a_2$ | −1.66E−03 |
| $a_3$ | 3.30E−05 |
| $a_4$ | −3.60E−07 |
| $a_5$ | 2.27E−09 |
| $a_6$ | −8.23E−12 |

TABLE 2-continued

| Coefficient | Value |
|---|---|
| $a_7$ | 1.59E−14 |
| $a_8$ | −1.26E−17 |

One of ordinary skill in the art will appreciate the materials and dimensions used for the first lens 410 and the second lens 412, as well as the window 416 and/or the material contained in the cavity 418, may be adjusted to obtain the desired results. Additionally, it should be appreciated that the materials and dimensions are dependent upon, among other things, the light source 210.

As an example, the thickness of the second lens 412, i.e., the distance between the common interface between the first lens 410 and the second lens 412 and the second surface 412b of the second lens 412 along the optical axis may be varied depending upon the type of material and the characteristics of converging lens used along the second surface 412b, as the amount of convergence desired for the optical system, e.g., the SLM 205 and the focus lenses 312.

Figure 5A:
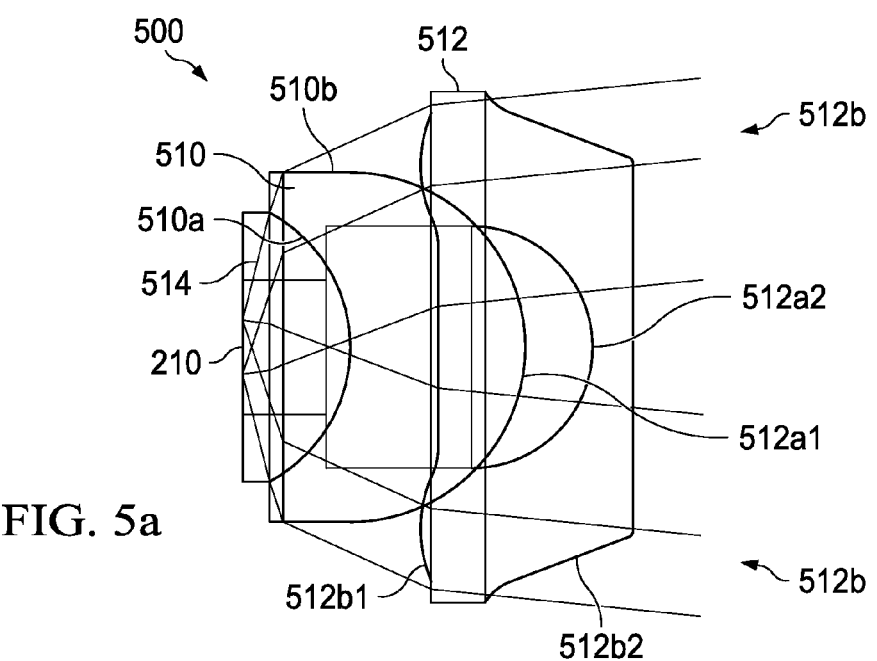
FIGS. 5a-5c illustrate another two element collecting lens in accordance with another embodiment.
Figure 5B:
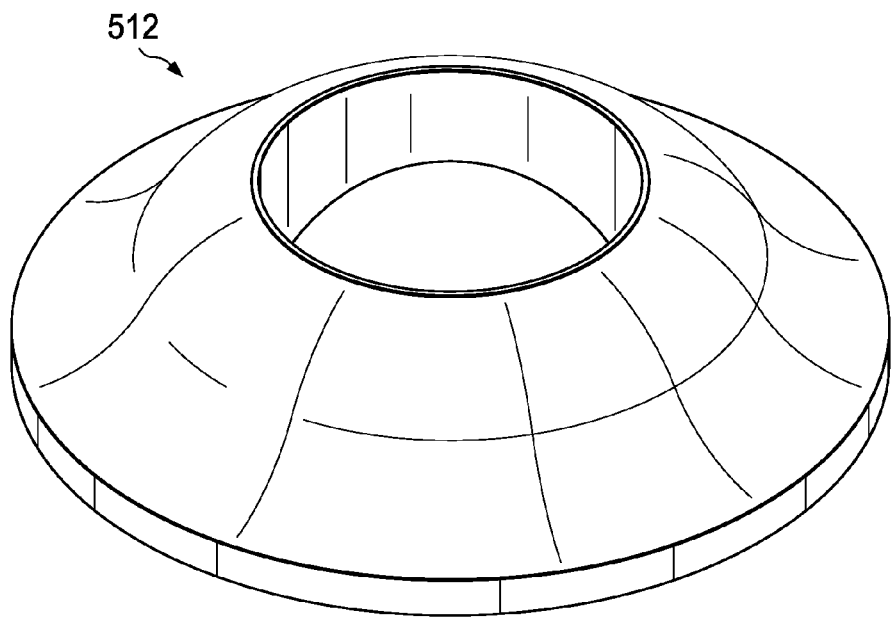
Figure 5C:
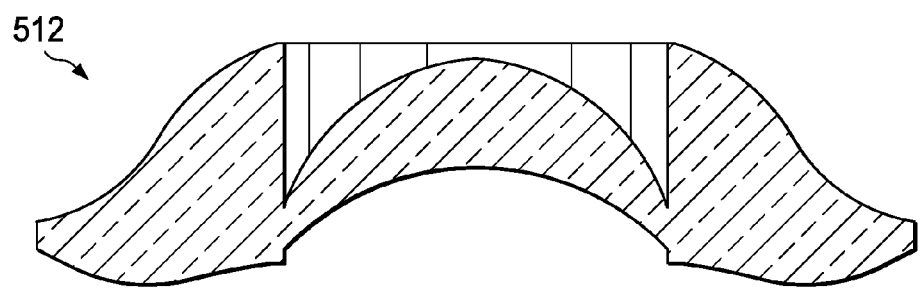

FIGS. 5a-5c illustrate a dual-channel collimator that may also act as the collimator 310 (see FIG. 3) and may be used in an optics system such as those discussed above. In particular, FIG. 5a illustrates a ray trace for a dual-channel collimator 500 having a first lens 510 and a second lens 512, FIG. 5b illustrates a perspective view of the second lens 512, FIG. 5c illustrates a cross-sectional perspective view of the second lens 512.

Similar to the embodiment discussed above with reference to FIG. 4, it is preferred that the first lens 510 be aplanatic in that there is little or no spherical aberration or coma. As such, the first lens 510 is preferably configured such that the center of the radial curvature of the first surface 510a and the second surface 510b of the first lens 510 are along the optical axis. In this configuration, the first surface 510a and the second surface 510b of the first lens 510 are rotationally symmetric about the optical axis.

Similar to the embodiment discussed above with reference to FIG. 4, it is preferred that the first lens 510 be aplanatic in that there is little or no spherical aberration or coma. As such, the first lens 510 is preferably configured such that the center of the radial curvature of the first surface 510a and the second surface 510b of the first lens 510 are along the optical axis. In this configuration, the first surface 510a and the second surface 510b of the first lens 510 are rotationally symmetric about the optical axis.

The second lens 512 has an inner portion 512a and an outer portion 512b, wherein the inner portion 512a comprises a lens having a first set of characteristics and the outer portion 512b comprises an aspherical lens ring around the circumference of the inner portion 512a. The effect of the inner portion 512a and the outer portion 512b is to provide two different paths for the light: one path for light relatively close to the optical axis; and another path for light farther from the optical axis. In an embodiment the inner portion 512a and the outer portion 512b of the second lens 512 are configured such that the inner portion 512a creates a first channel for light between about 0 degrees to about 40 degrees relative to the optical axis and the outer portion 512b creates a second channel for light between about 40 degrees to about 80 degrees relative to the optical axis.

As illustrated in FIG. 5a, the inner portion 512a has an inner surface 512a1 having a spherical surface that has a conformal surface to the outer surface 510b of the first lens 510. While FIG. 5a illustrates an embodiment in which the entire inner surface 512a1 of the inner portion 512a shares a common interface with the second surface of the first lens, other embodiments may only have a portion of the inner surface 512a1 of the inner portion 512a that is in direct contact with the outer surface 510b of the first lens 510. The outer surface 512a2 of the inner portion 512a preferably has an aspherical shape, though spherical or other shapes may be used.

Details of an example of the construction of two element collecting lens system such as that illustrated in FIGS. 5a-5c is provided in Table 3. It should be noted that this embodiment is but one example, and other dimensions, materials, and configurations may be used. In this example, it is assumed that an LED having dimensions of about 1 mm×1 mm and emitting light in the 460 nm-700 nm wavelengths is being used. This configuration has a length of about 13 mm, and a height of about 11 mm. It has been found that such a configuration exhibits an etendue degradation of less than about 10%-20%.

Details of an example of the construction of double refractive lens system such as that illustrated in FIGS. 5a-5c is provided in Table 3. It should be noted that this embodiment is but one example, and other dimensions, materials, and configurations may be used. In this example, it is assumed that an LED having dimensions of about 1 mm×1 mm and emitting light in the 460 nm-700 nm wavelengths is being used. This configuration has a length of about 13 mm, and a height of about 11 mm. It has been found that such a configuration exhibits an etendue degradation of less than about 10%-20%.

TABLE 3

| Radius of Curvature (mm) | Thickness (mm) | Material | Conic | Lens Surface |
|---|---|---|---|---|
| Outer Path (between about 40 to about 80 degrees) | | | | |
| Infinite | 1.69 | Encapsulant (Index of about 1.5) | 0 | AirGap between LED (210) and First Surface (510a) of the First Lens (510). |
| −5.903 | 3.415 | S-LAH79 | 0 | First Surface (510a) of First Lens (510). |
| −4 | −1.4 | Air | 0 | Interface between Outer Surface (510b) and the air gap. |
| 10.82 | 4.3 | PMMA | 0 | Interface between the air |

TABLE 3-continued

| Radius of Curvature (mm) | Thickness (mm) | Material | Conic | Lens Surface |
|---|---|---|---|---|
| | | | (Aspherical Surface 1 coefficients identified Table 4) | gap and the Inner Surface (512b1) of the Second Lens (512). |
| Infinite | n/a | air | −14740 (Aspherical Surface 2 coefficients identified Table 4) | Interface between Second Lens (512) and the air. |
| Inner Path (between about 40 to about 80 degrees) | | | | |
| Infinite | 1.69 | Encapsulant (Index of about 1.5) | 0 | Area between LED (210) and First Surface (510a) of the First Lens (510). |
| −5.903 | 3.415 | S-LAH79 | 0 | First Surface (510a) of First Lens (510). |
| −4 | 1.5 | PMMA | 0 | Interface between First Lens (510) and Second Lens (512). |
| −2.766 | n/a | air | −0.4157 (Aspherical Surface 3 coefficients identified Table 4) | Interface between Second Lens (512) and the air. |

TABLE 4

| Coefficient | Aspherical Surface 1 Coefficients | Aspherical Surface 2 Coefficients | Aspherical Surface 2 Coefficients |
|---|---|---|---|
| $a_1$ | 0.0 | 0.0 | 0.0 |
| $a_2$ | −7.20E−03 | −0.01374 | −7.24E−03 |
| $a_3$ | 3.39E−04 | 8.17E−04 | −1.87E−03 |
| $a_4$ | −7.95E−06 | −2.52E−05 | −2.24E−04 |
| $a_5$ | 8.44E−08 | 3.02E−07 | 1.00E−05 |

One of ordinary skill in the art will appreciate the materials and dimensions used for the first lens 510 and the second lens 512, as well as the encapsulant 514, may be adjusted to obtain the desired results. Additionally, it should be appreciated that the materials and dimensions are dependent upon, among other things, the light source 210.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An image projection system comprising:
   a light source positioned to emit light along a light path; and
   a collection lens positioned along the light path, the collection lens including at least two lenses, both lenses having a positive power and in direct contact with each other, a first lens closest to the light source having a concave first surface closest to the light source.

2. The image projection system of claim 1, wherein the light source is a light-emitting diode.

3. The image projection system of claim 1, wherein the collection lens comprises a ball lens.

4. The image projection system of claim 1, wherein the collection lens comprises a hyperhemispherical ball first lens, an outer circumference of the hyperhemispherical ball lens being separated from a second lens.

5. The image projection system of claim 1, wherein the collection lens comprises a hemispherical ball first lens, an entire outer surface of the hemispherical ball first lens being in contact with a second lens.

6. The image projection system of claim 5, wherein the collection lens includes a Fresnel lens.

7. The image projection system of claim 1, wherein a second lens comprises an inner portion and an outer portion, the inner portion having different lens prescription than the outer portion.

8. The image projection system of claim 7, wherein the inner portion of the second lens receives light through direct contact with the first lens.

9. The image projection system of claim 7, wherein the outer portion of the second lens does not receive light through direct contact with the first lens.

10. A collection lens for a projection display system, the collection lens comprising:
    a first lens, the first lens having a first concave surface and a second surface;

a second lens, the second lens having a third surface and a fourth surface, at least a portion of the third surface of the second lens being in direct contact with the second surface of the first lens.

11. The collection lens of claim 10, wherein the first surface is spherical.

12. The collection lens of claim 10, wherein the first lens is hemispherical.

13. The collection lens of claim 10, wherein the first lens is hyperhemispherical.

14. The collection lens of claim 10, wherein the second lens includes a Fresnel lens.

15. The collection lens of claim 10, wherein the second lens includes a lens having two aspherical surfaces.

16. The collection lens of claim 10, wherein the second lens comprises an inner portion and an outer portion, the inner portion having different lens prescription than the outer portion.

17. The collection lens of claim 16, wherein the inner portion is in direct contact with the first lens and the outer portion is separated from the first lens.

18. A method of manufacturing a projection system, the method comprising:

providing a light source; and positioning a collection lens along the light path of the light source, the collection lens having a first lens and a second lens, the first lens and the second lens having a positive power and in direct contact with each other, the first lens positioned along the light path closest to the light source and having a first concave surface positioned along the light path closest to the light source.

19. The method of claim 18, wherein the first lens is hemispherical.

20. The method of claim 18, wherein the first lens is hyperhemispherical.

21. The method of claim 18, wherein the second lens has a first spherical surface and a second Fresnel surface along the light path.

22. The method of claim 18, wherein the second lens has a first portion and a second portion, the second portion encircling the first portion along a circumference of the first portion, the second portion having two aspherical surfaces.

23. The method of claim 22, wherein the first portion comprises a first surface having a spherical surface and a second surface having an aspherical surface.

* * * * *